US011305671B2

(12) United States Patent
Yoshida

(10) Patent No.: US 11,305,671 B2
(45) Date of Patent: Apr. 19, 2022

(54) METHOD OF CONTROLLING ELECTRIC VEHICLE AND ELECTRIC VEHICLE SYSTEM

(71) Applicant: NISSAN MOTOR CO., LTD., Yokohama (JP)

(72) Inventor: Hideo Yoshida, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/277,356

(22) PCT Filed: Sep. 26, 2018

(86) PCT No.: PCT/JP2018/035757

§ 371 (c)(1),
(2) Date: Mar. 18, 2021

(87) PCT Pub. No.: WO2020/065780

PCT Pub. Date: Apr. 2, 2020

(65) Prior Publication Data

US 2022/0024351 A1 Jan. 27, 2022

(51) Int. Cl.
*B60L 58/40* (2019.01)
*B60L 50/75* (2019.01)
(Continued)

(52) U.S. Cl.
CPC ............... *B60L 58/40* (2019.02); *B60L 50/75* (2019.02); *B60L 53/14* (2019.02); *B60L 55/00* (2019.02);
(Continued)

(58) Field of Classification Search
CPC .......... B60L 58/40; B60L 55/00; B60L 53/14; B60L 50/75; H02J 7/0013; H02J 7/0063; H02J 7/34; H02J 2310/48; H02J 2300/30
See application file for complete search history.

(56) References Cited

U.S. PATENT DOCUMENTS 7,923,861 B2 * 4/2011 Kojima ................ B60L 3/0046 307/53
2016/0137065 A1 5/2016 Matsubara et al.

FOREIGN PATENT DOCUMENTS

DE 10 2014 011 768 A1 2/2015
EP 0 972 668 A2 1/2000
JP 2016-127632 A 7/2016

* cited by examiner

*Primary Examiner* — Carlos Amaya
(74) *Attorney, Agent, or Firm* — Foley & Lardner LLP

(57) ABSTRACT

An electric vehicle including: a battery configured to store electric power; a motor electrically connected to the battery through a first wire; an external port connected to a second wire branched from the first wire, the external port being used for input/output of electric power from/to an external device; a converter provided between the external port and the first wire on the second wire; an electric generator provided on a third wire bypassing the converter from the second wire; a first switch provided on the third wire on the external port side relative to the electric generator; and a second switch provided on the third wire on an opposite side of the first switch relative to the electric generator. A method of controlling the electric vehicle, wherein in a case in which electric power generated by the electric generator is supplied to the external device, the first switch is turned OFF and the second switch is turned ON such that the electric power generated by the electric generator is supplied to the external device through the converter.

8 Claims, 8 Drawing Sheets

(51) Int. Cl.
*B60L 55/00* (2019.01)
*B60L 53/14* (2019.01)
*H02J 7/00* (2006.01)
*H02J 7/34* (2006.01)

(52) U.S. Cl.
CPC .......... *H02J 7/0013* (2013.01); *H02J 7/0063* (2013.01); *H02J 7/34* (2013.01); *H02J 2300/30* (2020.01); *H02J 2310/48* (2020.01)

METHOD OF CONTROLLING ELECTRIC VEHICLE AND ELECTRIC VEHICLE SYSTEM

TECHNICAL FIELD

The present invention relates to a method of controlling an electric vehicle and an electric vehicle system.

BACKGROUND ART

In an electric vehicle having a motor as a driving source for traveling, the motor is driven by electric power generated by an electric generator and electric power output from a battery. It has been considered to supply electric power to an external device of the electric vehicle by using the electric generator and/or the battery of the vehicle as described above.

For example, JP2016-127632A discloses an electric vehicle in which electric power generated by a fuel cell serving as an electric generator is supplied to an external device when a SoC (State of Charge) of a battery is relatively low. In this electric vehicle, the electric power generated by the fuel cell is supplied to the external device after being converted to the desired voltage by two DC/DC converters.

SUMMARY OF INVENTION

With the technique disclosed in JP2016-127632A, because the electric power generated by the fuel cell is supplied to the external device via the two converters, a power loss in the converters is increased. Consequently, there is a problem in that a power consumption in the electric vehicle is increased.

The present invention has been invented to solve the problem described above, and an object thereof is to reduce a power loss when electric power is supplied to an external device.

According to one embodiment of the present invention, an electric vehicle including: a battery configured to store electric power; a motor electrically connected to the battery through a first wire; an external port connected to a second wire branched from the first wire, the external port being used for input/output of electric power from/to an external device; a converter provided between the external port and the first wire on the second wire; an electric generator provided on a third wire bypassing the converter from the second wire; a first switch provided on the third wire on the external port side relative to the electric generator; and a second switch provided on the third wire on an opposite side of the first switch relative to the electric generator. A method of controlling the electric vehicle, wherein in a case in which electric power generated by the electric generator is supplied to the external device, the first switch is turned OFF and the second switch is turned ON such that the electric power generated by the electric generator is supplied to the external device through the converter.

DESCRIPTION OF EMBODIMENTS

An electric vehicle according to an embodiment of the present invention will be described below with reference to the drawings.

First Embodiment

Figure 1:
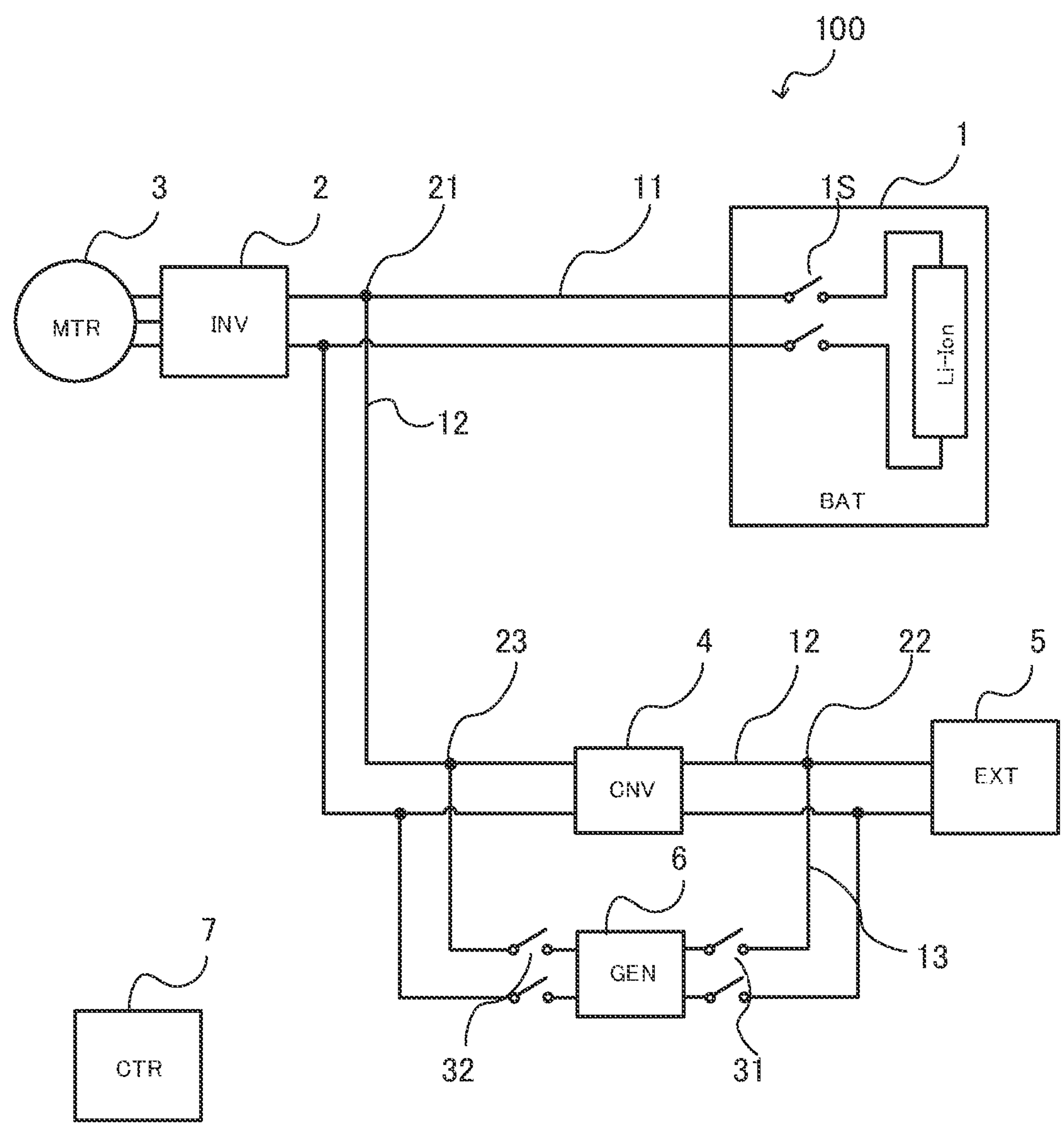
FIG. 1 is a schematic configuration diagram of an electric vehicle system according to a first embodiment.

FIG. 1 is a schematic configuration diagram of an electric vehicle system 100 according to a first embodiment of the present invention. In a DC system, a wiring of the electric vehicle system 100 is formed of a pair of wires of two different kinds, i.e. positive and negative wires, and switches are respectively provided on the pair of wires. In the description below, for the wires and switches, a distinction is not made between anode and cathode, and a single reference numeral is assigned therefor.

The electric vehicle system 100 is mounted on an electric vehicle and has a battery 1, an inverter 2, a motor 3, a converter 4, an external port 5, an electric generator 6, and a controller 7. The controller 7 controls the overall electric vehicle system 100 by controlling output of the battery 1, driving of the electric generator 6, switches, which will be described below, and so forth.

The battery 1 supplies electric power to the motor 3, which is electrically connected to battery 1, through a first wire 11 on which an inverter 2 is provided. The inverter 2 converts DC power supplied from the battery 1 to three-phase AC power and supplies thus converted AC power to the motor 3. The motor 3 is rotationally driven by receiving the supply of the AC power. A switch 1S that controls an input/output of the battery 1 is provided on the first wire 11. The switch 1S is formed integrally with the battery 1. In this embodiment, the battery 1 is a lithium ion battery. Because the battery 1 is configured such that output voltage thereof satisfies a required voltage of the motor 3, a converter is not provided on the first wire 11.

In this embodiment, the inverter 2 is provided on the first wire 11 because the motor 3 is driven by AC. However, the configuration is not limiter thereto. If the motor 3 is driven by DC, the inverter 2 can be omitted, and therefore, the battery 1 is connected to the motor 3 by the first wire 11.

On the first wire 11 in the electric vehicle system 100, a second wire 12 is provided so as to be branched from a first junction point 21 between the battery 1 and the inverter 2. The converter 4 is provided on the second wire 12 and the second wire 12 is connected to the external port 5. The converter 4 is a DC/DC converter that is capable of increasing and decreasing the voltage in both directions.

The electric power that has supplied from the battery 1 is supplied to the converter 4 through the first wire 11, the first junction point 21, and the second wire 12. The electric power that has been subjected to a voltage conversion in the converter 4 is then supplied to the external port 5. As a result, the electric vehicle system 100 can supply the electric power to an external device through the external port 5. The electric power may be input from the external port 5, and the battery 1 may be charged by the power thus input. In other words, it is possible to use the external port 5 for the output/input of the electric power.

Furthermore, in the electric vehicle system 100, a third wire 13 is provided on the second wire 12 so as to bypass the converter 4. Among junction points of the second wire 12 with the third wire 13, the junction point located on the side of the external port 5 is referred to as a second junction point 22 and the junction point located on the side of the first junction point 21 is referred to as a third junction point 23.

The electric generator 6 is provided on the third wire 13. In addition, on the third wire 13, a first switch 31 is provided on the side of the second junction point 22, in other words, on the side of the external port 5, with respect to the electric generator 6 and a second switch 32 is provided on the opposite side of the first switch 31, in other words, on the side of the third junction point 23 and the first wire 11, with respect to the electric generator 6.

In this embodiment, the electric generator 6 is an SOFC type fuel cell (Solid Oxide Fuel Cell) and is controlled by the controller 7. The electric generator 6 is not limited to the SOFC type fuel cell, and it may be a PEM type fuel cell (Polymer Electrolyte Membrane type fuel cell) or an electric generator that is driven by using gasoline as a fuel.

In the following, states of the switches corresponding to a driven state of the electric vehicle system 100 will be described for respective cases.

(Case 1)

Figure 2:
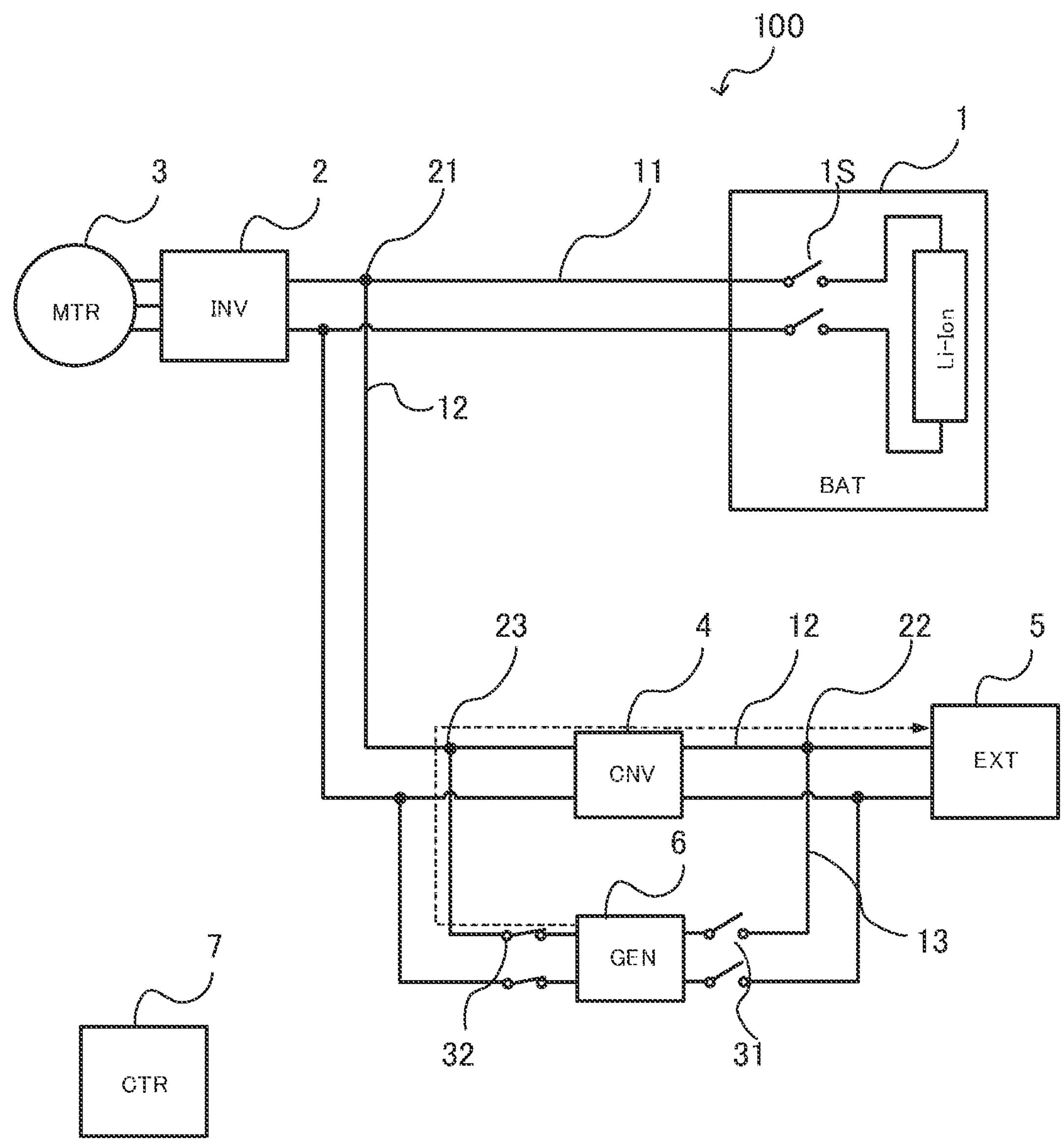
FIG. 2 is an explanatory diagram of an operation of the electric vehicle system in a case 1.

FIG. 2 is a diagram for explaining a power control of the electric vehicle system 100 in a case 1. The case 1 shows an example in which, when the electric vehicle system 100 is stopped, the electric power generated by the electric generator 6 is supplied to the external device connected to the external port 5. According to the case 1, because the battery 1 is not used for a power supply to the external device, it is possible to prevent decrease in the SoC of the battery 1 due to the power supply to the external device.

The controller 7 drives the electric generator 6 in a state in which the switch 1S of the battery 1 is turned OFF and the output of the electric power from the battery 1 is shut off. At the same time, the controller 7 turns the first switch 31 OFF and turns the second switch 32 ON.

By performing a switching control as described above, the electric power generated by the electric generator 6 flows to the second wire 12 through the third junction point 23 from the side of the second switch 32 in a conducted state in the third wire 13, and the electric power is supplied to the external port 5 after being converted to the desired voltage by the converter 4. As described above, the electric power is supplied to the external device connected to the external port 5.

With the configuration described above, the electric power generated by the electric generator 6 is supplied to the external device through the external port 5 by being subjected to the voltage conversion by the single converter 4. Thus, as compared with the case in which a plurality of converters are used as in the conventional approach, it is possible to suppress a power loss in the converter 4. Furthermore, the battery 1 is not used for the power supply to the external device. Thus, a charged/discharged amount of the battery 1 is decreased to restrict the number of charged/discharged cycle of the battery 1 over its whole life, and therefore, it is possible to suppress the deterioration of the battery 1.

(Case 2)

Figure 3:
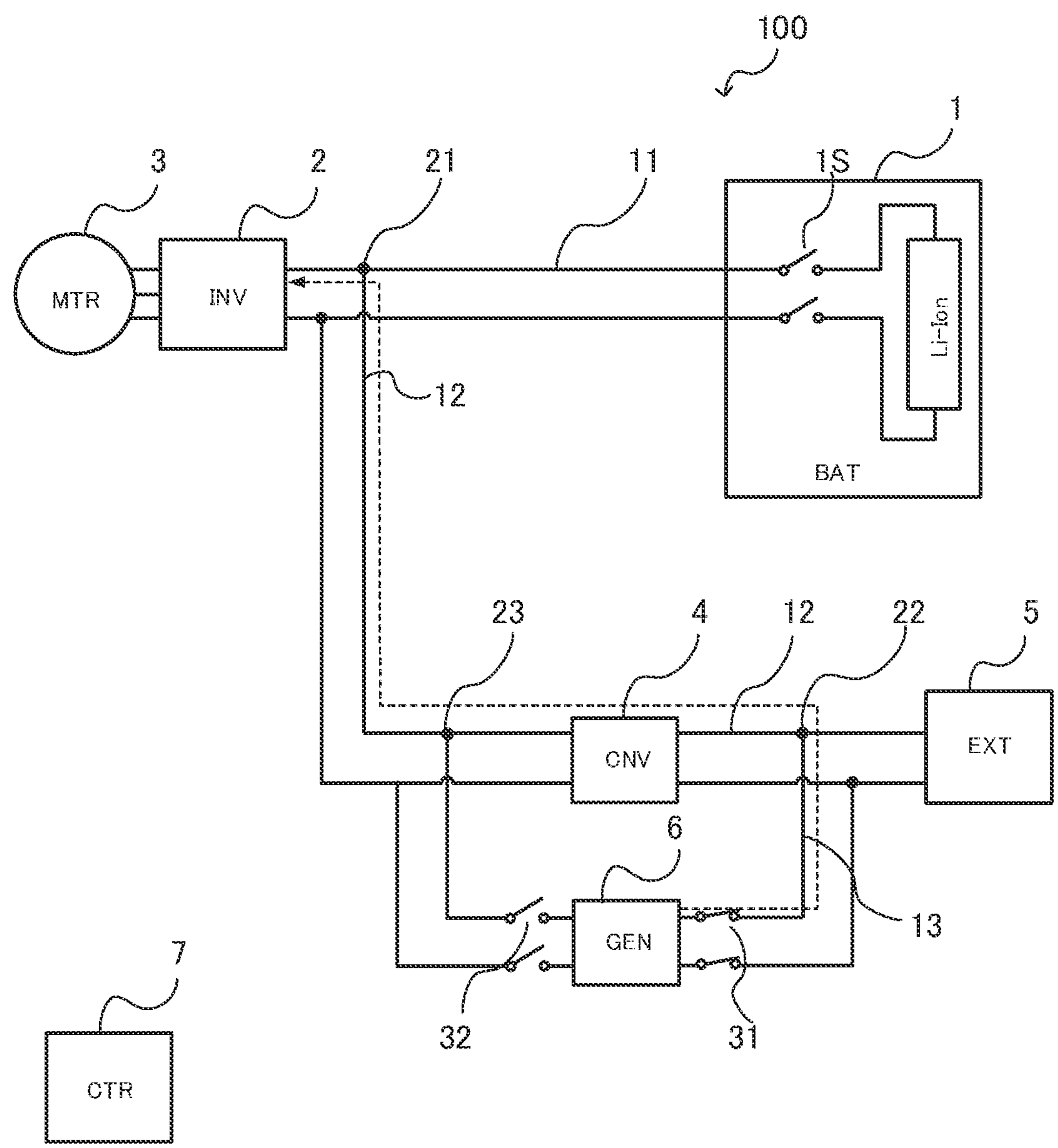
FIG. 3 is an explanatory diagram of the operation of the electric vehicle system in a case 2.

FIG. 3 is a diagram for explaining the power control of the electric vehicle system 100 in a case 2. The case 2 shows an example in which the electric vehicle system 100 is in a travelling state. In order to simplify the comparison with the case 1, it is assumed that, in the case 2, the SoC of the battery 1 has been decreased, the electric power is not supplied from the battery 1, and only the electric power generated by the electric generator 6 is supplied to the motor 3.

The controller 7 drives the electric generator 6 in a state in which the switch 1S of the battery 1 is turned OFF and the output of the electric power from the battery 1 is shut off. At the same time, the controller 7 turns the first switch 31 ON and turns the second switch 32 OFF.

By performing the switching control as described above, the electric power generated by the electric generator 6 flows to the second wire 12 through the second junction point 22 from the side of the first switch 31 in the conducted state in the third wire 13, and the electric power is supplied to the motor 3 through the third junction point 23, the first junction point 21, the first wire 11, and the inverter 2. As described above, the electric power generated by the electric generator 6 is supplied to the motor 3.

With the configuration described above, the electric power generated by the electric generator 6 is supplied to the motor 3 by being subjected to the voltage conversion by the single converter 4. Thus, as compared with the case in which the plurality of converters are used, it is possible to suppress the power loss in the converter 4.

In a case in which the SoC of the battery 1 has not been decreased extremely, the electric power may be supplied from the battery 1 to the motor 3. In such a case, the switch 1S is turned ON, and the electric power is supplied to the motor 3 also from the battery 1. The electric power generated by the electric generator 6 is also used to charge the battery 1.

(Case 3)

Figure 4:
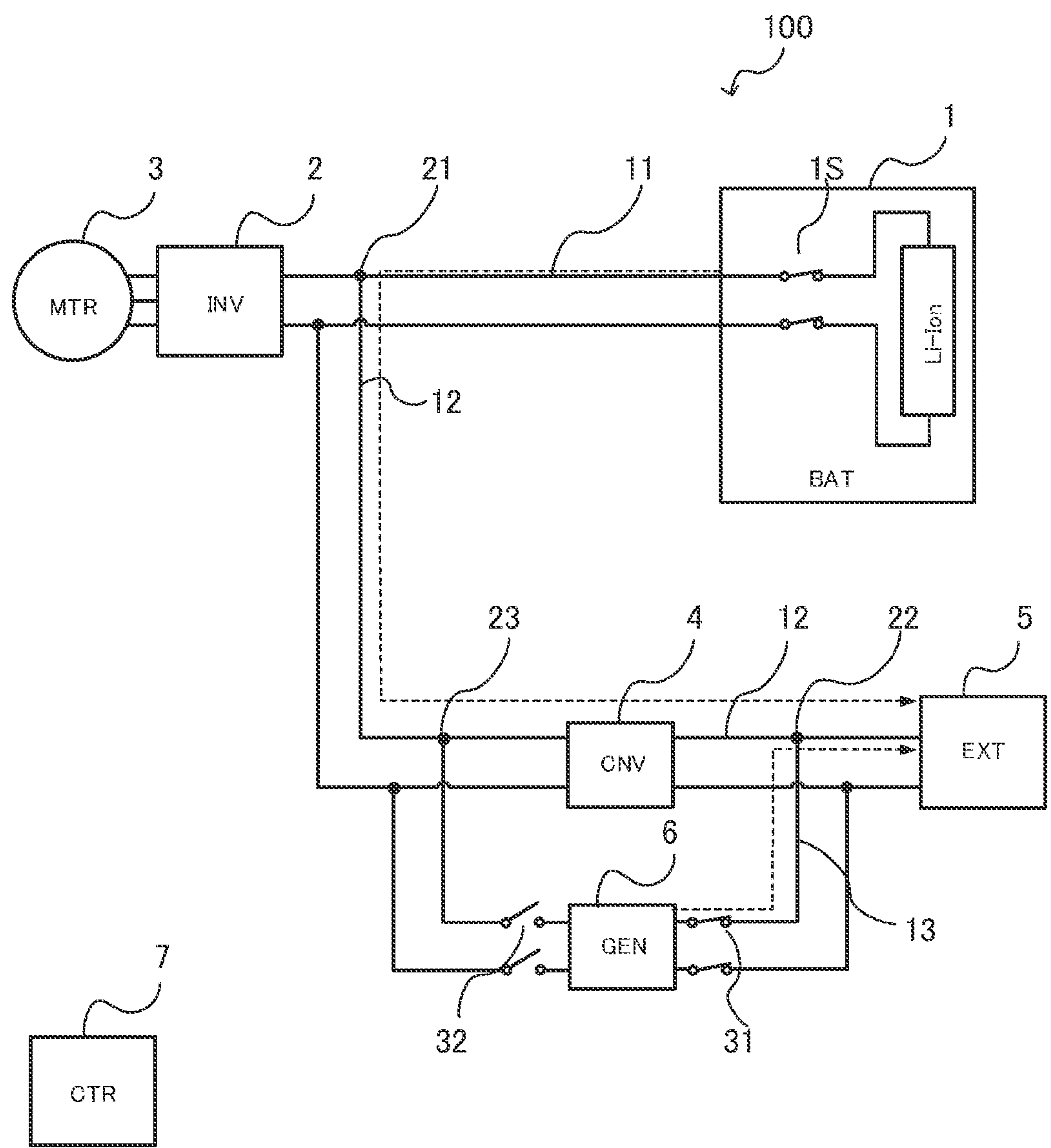
FIG. 4 is an explanatory diagram of the operation of the electric vehicle system in a case 3.

FIG. 4 is a diagram for explaining the power control of the electric vehicle system 100 in a case 3. The case 3 assumes a case in which, when the electric vehicle system 100 is stopped, the electric power is supplied from the battery 1 and the electric generator 6 to the external device through the external port 5. In the case 3, as compared with the case 1, a required power of the external device exceeds the electric power generated by the electric generator 6, and the electric power is supplied to the external device from both of the battery 1 and the electric generator 6. Even in a case in which the electric power suppliable from the battery 1 exceeds the required power of the external device, for the reason described below, the electric generator 6 is not halted, and the electric power is supplied to the external device from the battery 1 and the electric generator 6.

The controller 7 allows the output of the electric power from the battery 1 by turning the switch 1S of the battery 1 ON and drives the electric generator 6. Furthermore, the controller 7 turns the first switch 31 ON and turns the second switch 32 OFF.

When supplied power is received from the battery 1 through the first wire 11, the first junction point 21, and the second wire 12, the converter 4 performs a voltage conversion to the supplied power. In other words, unlike the case 1, the converter 4 does not perform the voltage conversion of the electric power generated by the electric generator 6. Because the electric power generated by the electric generator 6 is supplied to the external port 5 by bypassing the converter 4, the output of the electric generator 6 is controlled so as to become equal to the required voltage of the external device. On the other hand, because the electric power supplied from the battery 1 is supplied to the external port 5 through the converter 4, the electric power is converted by the converter 4 to the required voltage of the external device.

Thus, the controller 7 first determines the output of the electric generator 6 such that the output voltage becomes equal to the required voltage of the external device. Next, the controller 7 determines the output of the battery 1 such that the output becomes equal to a shortfall of electric power generated by the electric generator 6 for the required power of the external device. As described above, the controller 7 determines the output of the battery 1 after determination of the output of the electric generator 6. The reason why such a control can be performed will be described below.

Figure 5A:
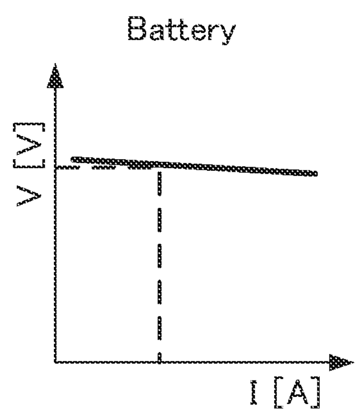
FIG. 5A is a graph showing a relationship between electric current and voltage of output power from a battery.
Figure 5B:
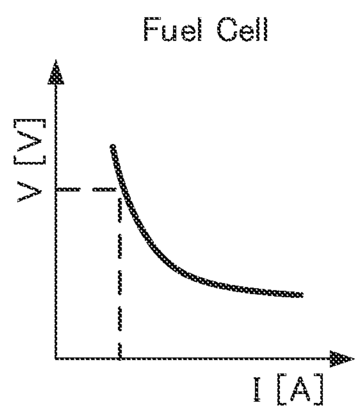
FIG. 5B is a graph showing a relationship between electric current and voltage of output power from a fuel cell.

FIG. 5A is a graph showing a relationship between electric current I and voltage V of the electric power output from the battery 1. FIG. 5B is a graph showing a relationship between the electric current I and the voltage V of the electric power output from the electric generator 6, which is a fuel cell.

In FIGS. 5A and 5B, focusing on the rate of change of the voltage V relative to the change in the electric current I, the rate of change of the voltage in the battery 1 is smaller than the rate of change of the voltage in the electric generator 6.

As shown in FIG. 5B, because the rate of change of the voltage V relative to the electric current I in the electric generator 6 is large, it is possible to control the output voltage of the electric generator 6 so as to become equal to the required voltage of the external device at any points on the curve illustrated. After the output of the electric generator 6 (the amount of electricity generated) is determined by the controller 7, the controller 7 then determines the output of the battery 1 so as to become equal to the shortfall obtained by subtracting the amount of electricity generated by the electric generator 6 from the required power of the external device.

As described above, the controller 7 determines the output of the battery 1 after the determination of the output of the electric generator 6.

In a case where the electric generator 6 is formed of the fuel cell, as compared with a case in which an internal combustion engine is employed as the electric generator, for example, the change in the electric current I and the voltage V is relatively large relative to the electric power output. Furthermore, the electric power is kept substantially a constant relative to the change in the electric current I, or the electric power is gradually increased as the electric current I is increased. As described above, even if the electric current I of the electric generator 6 is changed, the output of the electric generator 6, which is the fuel cell, does not change greatly, and therefore, it is possible to control the outputs of the electric generator 6 and the battery 1 relatively stably.

Furthermore, it is preferable that the fuel cell employed as the electric generator 6 be the SOFC. The SOFC is known to be operated at a high efficiency over a wide output range, and therefore, even if the output is low, the risk of deterioration of the efficiency is low.

According to the electric vehicle system 100 of the first embodiment described above, following effects can be achieved.

According to the electric vehicle system 100 of the first embodiment, in order to establish a state in which the electric power generated in the electric generator is output to the external device through the external port 5, the controller 7 drives the electric generator 6 in a state in which the switch 1S is turned OFF and the output of the electric power from the battery 1 is shut off. At the same time, the controller 7 turns the first switch 31, which is on the side of the external port 5, OFF and turns the second switch 32, which is on the opposite side of the first switch 31, ON.

By performing the control as described above, the electric power generated by the electric generator 6 reaches the converter 4 through the second switch 32 in the conducted state and is converted to the required voltage of the external device by the converter 4, and thereby, the electric power is supplied to the external device through the external port 5. In other words, the electric power produced by the electric generator 6 is subjected to the voltage conversion in the single converter 4, and then, supplied to the external device through the external port 5. Thus, because the single converter 4 is used for the conversion of the electric power, it is possible to reduce a power consumption of the electric vehicle system 100 as compared with the case in which the plurality of converters are provided.

Furthermore, in the case 1, because the battery 1 is not used for the power supply to the external device, the battery 1 does not discharge the electricity. Especially, in a case in which the electric power is supplied to the external device for a long period of time, there is a risk in that the battery 1 is over-discharged; however, such a risk is reduced. Furthermore, the charged/discharged amount and the number of charged/discharged cycle of the battery 1 can be restricted over its whole life, and therefore, it is possible to suppress the deterioration of the battery 1.

According to the electric vehicle system 100 of the first embodiment, in order to supply the electric power generated by the electric generator 6 to at least one of the battery 1 and the motor 3, the controller 7 drives the electric generator 6 in a state in which the switch 1S is turned OFF and the output of the electric power from the battery 1 is shut off. At the same time, the controller 7 turns the first switch 31, which is on the side of the external port 5, ON, and turns the second switch 32, which is on the opposite side of the first switch 31, OFF.

By performing the control as described above, the electric power generated by the electric generator 6 reaches the converter 4 through the first switch 31 in the conducted state, is converted to the driving voltage of the motor 3 by the converter 4, and is supplied to the motor 3. The electric power generated by the electric generator 6 is supplied to the motor 3 after the voltage of which is converted by the single converter 4. Thus, as compared with the case in which the plurality of converters are provided, it is possible to reduce the power consumption of the electric vehicle system 100.

Although the electric vehicle system 100 of the first embodiment has only one converter 4, by respectively controlling the first switch 31 and the second switch 32 so as to be in the different ON/OFF state with each other, it is possible to output the electric power generated by the electric generator 6 to the motor 3 or the external device by converting its voltage to the desired voltage of the motor 3 or the external device.

According to the electric vehicle system 100 of the first embodiment, by turning the first switch 31 OFF and turning the second switch 32 ON, it is possible to supply the electric power generated by the electric generator 6 to the external device. In addition, by turning the first switch 31 ON and turning the second switch 32 OFF, it is possible to supply the electric power generated by the electric generator 6 to the motor 3. As described above, because the single converter 4 can be used for the respective voltage conversions in two different types of output controls in the cases 1 and 2, it is possible to reduce the manufacturing cost of the electric vehicle system 100.

According to the electric vehicle system 100 of the first embodiment, in order to supply the electric power to the external device from the battery 1 and the electric generator 6, the controller 7 drives the electric generator 6 in a state in which the switch 1S is turned ON and the electric power is output from the battery 1. At the same time, the controller 7 turns the first switch 31, which is on the side of the external port 5, ON and turns the second switch 32, which is on the opposite side of the first switch 31, OFF.

By performing the control as described above, the electric power generated by the electric generator 6 is supplied to the external device through the first switch 31 in the conducted state. In this case, the electric generator 6 is controlled such that the output voltage becomes equal to the required voltage of the external device. At the same time, the electric power supplied from the battery 1 is converted to the driving voltage of the motor 3 by the converter 4 and is supplied to the external device through the external port 5. As described above, in a case in which the electric power generated by the electric generator 6 is lower than the required power of the external device, it is possible to supply the electric power to the external device from both of the battery 1 and the electric generator 6.

Even if the electric power suppliable from the battery 1 exceeds the required power of the external device, the electric power produced by the electric generator 6 is supplied to the external device without halting the electric generator 6. Because the electric generator 6 is not halted, it is possible to suppress consumption of the fuel required for re-activation of the electric generator 6. Furthermore, because the electric power generated by the electric generator 6 is also supplied to the external device in addition to the supplied power from the battery 1, it is possible to suppress the electric power output from the battery 1. Therefore, the number of charged/discharged cycle of the battery 1 over its whole life is restricted, and thus, it is possible to suppress the deterioration of the battery 1.

According to the electric vehicle system 100 of the first embodiment, after the output of the electric generator 6 (the amount of electricity generated) is determined by the controller 7, the controller 7 determines the output of the battery 1 so as to become equal to the shortfall obtained by subtracting the amount of electricity generated by the electric generator 6 from the required power of the external device.

In such a case, the output voltage of the electric generator 6 is controlled so as to become equal to the required voltage of the external device without using the converter 4, and at the same time, the electric power output from the battery 1 is converted to the required voltage of the external device via the converter 4. Thus, it is possible to supply the voltage of the electricity generated by the electric generator 6 and the output voltage of the battery 1, both of which are at the required voltage of the external device, to the external device. Therefore, for two electric power sources, it is possible to control the voltages of the two electric power sources so as to become equal to the required voltage of the external device by using the single converter 4.

According to the electric vehicle system 100 of the first embodiment, in a case in which the fuel cell is employed as the electric generator 6, as compared with a case in which a general internal combustion engine is employed as an electric generator, the change in the electric current I and the voltage V relative to the electric power output is large. Furthermore, in a case in which the electric current I is changed such that the voltage becomes the desired voltage V, the electric power is kept substantially a constant, or the electric power is gradually increased as the electric current I is increased.

Thus, in a case in which the control is performed such that the voltage V output from the electric generator 6 becomes equal to the required voltage of the external device by changing the electric current I of the electric generator 6, because the output of the electric generator 6, which is the fuel cell, is not changed greatly, it is possible to perform the control of the electric generator 6 stably. Although the output of the battery 1 is controlled so as to become equal to the difference between the required power of the external device and the electric power generated by the electric generator 6, the output of the battery 1 is also not changed greatly. Because the electric generator 6 is controlled stably, the change in the output of the battery 1 is also suppressed. As described above, because the outputs from both of the battery 1 and the electric generator 6 are not changed greatly when they are controlled, it is possible to perform the control of the electric vehicle system 100 stably.

According to the electric vehicle system 100 of the first embodiment, it is preferable that the fuel cell be of the SOFC type. The SOFC type fuel cell can be operated at a high efficiency over a wide output range. In other words, even if the output from the electric generator 6 is low, the electric generator 6 can be driven without deteriorating the efficiency. Thus, it is possible to improve overall fuel consumption of the electric vehicle system 100.

As described above, in a case in which the electric power suppliable from the battery 1 exceeds the required power of the external device, it is also possible to halt the generating operation at the electric generator 6. However, because the electric generator 6, which is the SOFC type fuel cell, requires a warming-up operation when it is activated, it is not desirable to halt it temporarily. Thus, even if the battery 1 can supply all of the required power of the external device, the generating operation of the electric generator 6 is not halted and the electric power generated is supplied to the external device.

By performing the control as described above, lowering of temperature of the electric generator 6 is suppressed and the energy for the warming-up operation during the re-activation is not required, and therefore, it is possible to achieve an improvement in an operation efficiency of the electric vehicle system 100. In addition, because the discharged amount of the battery 1 can be reduced by an amount corresponding to the electric power generated by the electric generator 6, it is possible to suppress the deterioration of the battery 1.

Second Embodiment

In the first embodiment, an example in which the electric vehicle system 100 includes single battery 1 has been explained. In a second embodiment, an example in which the electric vehicle system 100 further has an additional battery will be explained. This additional battery is not used for the power supply to the motor 3. The additional battery is charged by the electric generator 6 and the thus charged electric power is used for the power supply to the external device.

Figure 6:
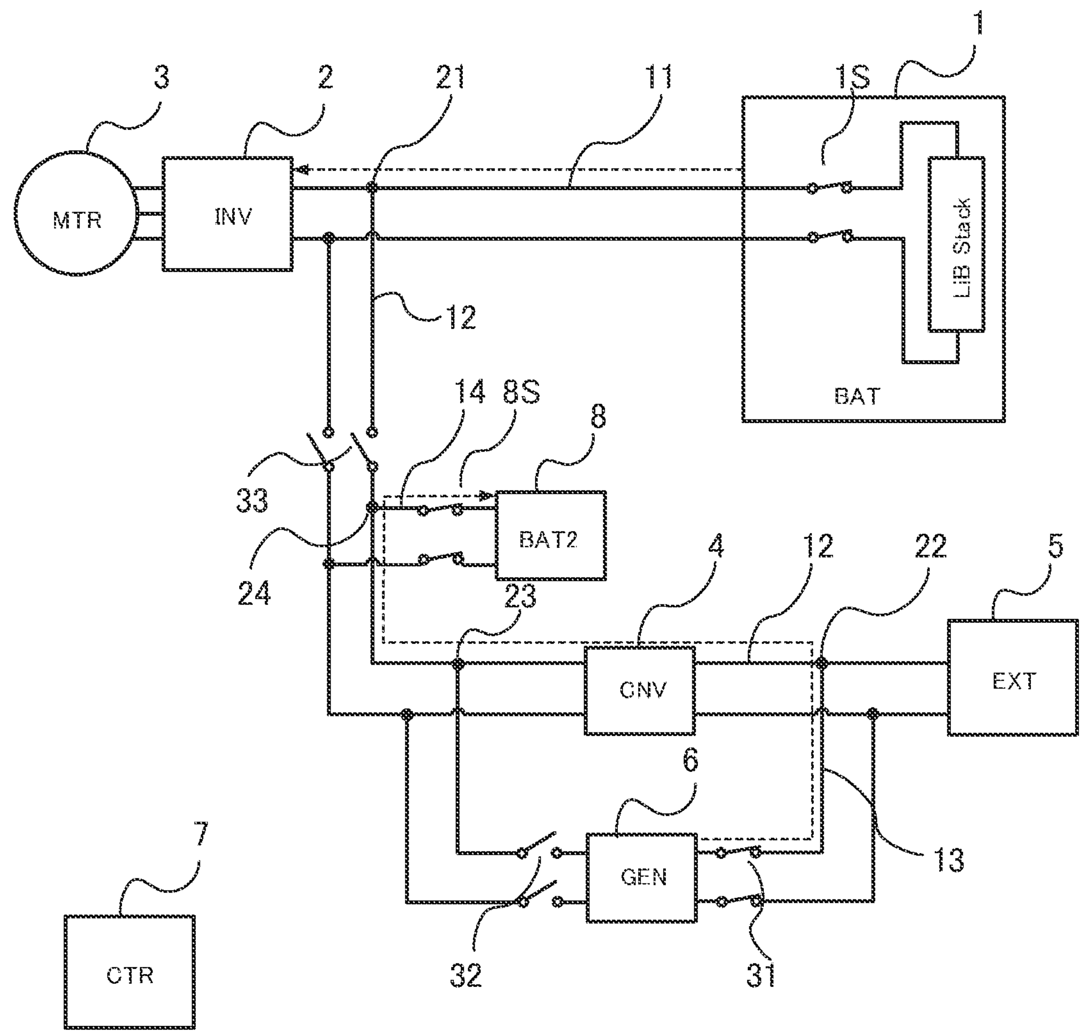
FIG. 6 is a schematic configuration diagram of the electric vehicle system according to a second embodiment.

FIG. 6 is a schematic configuration diagram of the electric vehicle system 100 according to the second embodiment.

In the second wire 12, a third switch 33 is provided between the first junction point 21 and the third junction point 23. A fourth junction point 24 is provided between the third switch 33 and the third junction point 23 on the second wire 12, and a fourth wire 14 is provided so as to be connected to the fourth junction point 24. An additional battery 8 is connected to the second wire 12 with the fourth wire 14. A switch 8S that controls an input/output of the additional battery 8 is provided on the fourth wire 14. In the following, the power control in such a configuration will be described.

(Case 4)

FIG. 6 is a diagram for explaining the power control of the electric vehicle system 100 in a case 4. In the case 4, the electric vehicle system 100 is in the travelling state, and the motor 3 is driven only by the electric power supplied from the battery 1. At the same time, the external device is not connected to the external port 5. In such a situation, the electric power generated by the electric generator 6 is stored in the additional battery 8, and thereby, the additional battery 8 can be used for the power supply to the external device in the future.

The controller 7 drives the electric generator 6 while driving the motor 3 by outputting the electric power from the battery 1 by turning the switch 1S of the battery 1 ON. At the same time, the controller 7 turns the first switch 31 ON, turns the second switch 32 OFF, and turns the third switch 33 OFF. Furthermore, the controller 7 turns the switch 8S ON, thereby connecting the additional battery 8 to the second wire 12 via the fourth wire 14.

In such a state, although the electric power from the battery 1 is supplied to the motor 3 via the first wire 11, because the third switch 33 provided on the second wire 12 is turned off, the electric power from the battery 1 is not supplied towards the side of the second wire 12.

The electric power generated by the electric generator 6 flows into the second wire 12 through the first switch 31 in the conducted state on the third wire 13 on the side of the external port 5 and the second junction point 22, and the electric power is supplied to the additional battery 8 through the fourth junction point 24 and the fourth wire 14 after being converted to an input voltage of the additional battery 8 in the converter 4.

As illustrated in the case 4, according to the electric vehicle system 100 of the second embodiment, following effects can be achieved.

According to the electric vehicle system 100 of the second embodiment, the controller 7 drives the electric generator 6 in a state in which the electric power is output from the battery 1 by turning the switch 1S ON. The controller 7 then turns the first switch 31 ON, turns the second switch 32 OFF, and turns the third switch 33 OFF.

Because the third switch 33 is turned OFF, the electric power is supplied to the motor 3 only from the battery 1 through the first wire 11. At the same time, the electric power generated by the electric generator 6 is charged to the additional battery 8 through the converter 4. The electric power stored in the additional battery 8 is used for the supply of the electric power to the external device in the future. Thus, the supply of the electric power from the battery 1 to the external device is suppressed, and so, it is possible to reduce the discharged amount of the battery 1 and to suppress the deterioration of the battery 1.

In a case in which a required torque of the motor 3 is low, and the electric power can be sufficiently supplied to the motor 3 by the battery 1 alone, the electric generator 6 may be halted temporarily. However, it is not preferable to temporarily halt the electric generator 6 because the warming-up operation, etc. at the time of re-activation requires time and energy. Thus, the generation of electricity by the electric generator 6 is not halted, the generated electric power is stored in the additional battery 8, and the stored electric power is then used for the future power supply to the external device. As described above, it is possible to improve an overall energy efficiency of the electric vehicle system 100.

Third Embodiment

In the second embodiment, the example in which the third switch 33 is provided on the second wire 12 has been explained. In a third embodiment, an example in which the third switch 33 is formed by employing a module used for a charging port will be explained. The module used as the charging port will be first explained.

Figure 7:
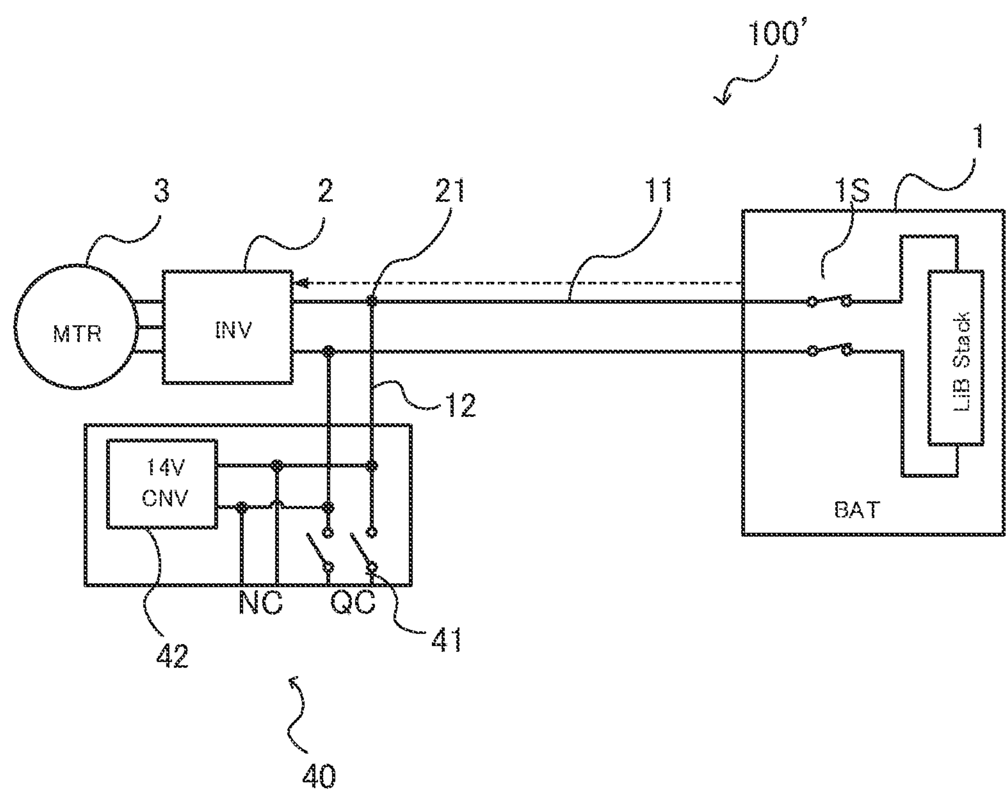
FIG. 7 is a schematic configuration diagram of the electric vehicle system employing a module used in a third embodiment.

FIG. 7 is a schematic configuration diagram of the electric vehicle system 100' in which a module 40 is employed as the charging port. The components of the electric vehicle system 100' shown in FIG. 7 include the similar components as those of the electric vehicle systems 100 shown in FIGS. 1 to 6, and the same reference numerals are assigned to the components having the same functions in the description.

In the electric vehicle system 100', the first wire 11 connecting the battery 1 and the inverter 2 is connected to a quick charging port QC of the module 40 through the second wire 12 connected at the first junction point 21. In addition, a switch 41 for controlling input/output of the quick charging port QC is provided in the module 40. In this configuration, it is possible to quickly charge the battery 1 by inputting large electric current from the quick charging port QC. Because the large electric current is input, the switch 41 has a high resistance against the electric current.

Furthermore, a normal charging port NC is provided in the module 40, and a converter 42 (14V) is provided between the quick charging port QC and the normal charging port NC. The voltage of the electric power that has been input through the normal charging port NC is increased by the converter 42, and subsequently, it is supplied to the battery 1 through the second wire 12 and the first wire 11.

As described above, the electric vehicle system 100' including the module 40 as the charging port performs a quick charging and a normal charging in a switching manner. The electric vehicle system 100' also includes the switch 41 with a high resistance against the electric current.

Figure 8:
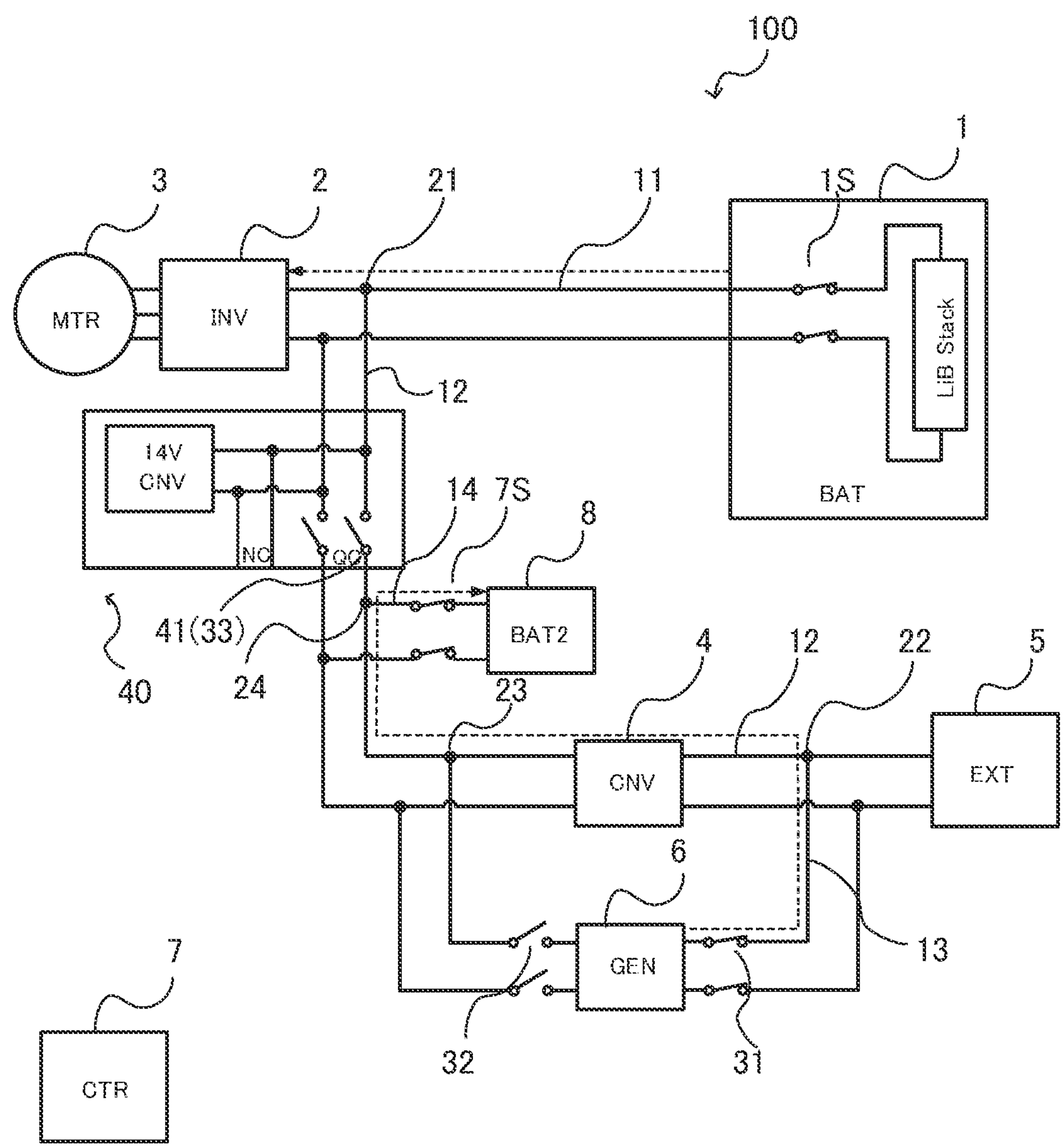
FIG. 8 is a schematic configuration diagram of the electric vehicle system according to the third embodiment.

FIG. 8 is a schematic configuration diagram of the electric vehicle system 100 according to the third embodiment. In the electric vehicle system 100, the switch 41 of the module 40 described above is used as the third switch 33. By forming the electric vehicle system 100 by employing the module 40, it is possible to achieve reduction in the manufacturing cost.

Generally, the manufacturing cost is high for the switch, through which the large electric current flows. Thus, in a case in which a member distributed for other purposes, such as the module 40, is used and the switch 41 provided closer to the quick charging port QC is used as the third switch 33, it is possible to achieve further reduction in the cost than in a case in which the third switch 33 is provided alone.

Although the embodiments of the present invention have been described in the above, the above-mentioned embodiments merely illustrate parts of application examples of the present invention, and the technical scope of the present invention is not intended to be limited to the specific configurations of the above-described embodiments. In addition, the above-mentioned embodiments may be combined appropriately.

The invention claimed is:

1. A method of controlling an electric vehicle, the electric vehicle including:

a battery configured to store electric power;

a motor electrically connected to the battery through a first wire;

an external port connected to a second wire branched from the first wire, the external port being used for input/output of electric power from/to an external device;

a converter provided between the external port and the first wire on the second wire;

an electric generator provided on a third wire bypassing the converter from the second wire;

a first switch provided on the third wire on the external port side relative to the electric generator; and a second switch provided on the third wire on an opposite side of the first switch relative to the electric generator; wherein in a case in which electric power generated by the electric generator is supplied to the external device, the first switch is turned OFF and the second switch is turned ON such that the electric power generated by the electric generator is supplied to the external device through the converter.

2. The method of controlling the electric vehicle according to claim 1, wherein in a case in which the electric power generated by the electric generator is supplied to at least one of the motor and the battery, the first switch is turned ON and the second switch is turned OFF such that the electric power generated by the electric generator is supplied to at least one of the motor and the battery through the converter.

3. The method of controlling the electric vehicle according to claim 1, wherein in a case in which the electric power is supplied to the external device from the electric generator and the battery, the first switch is turned ON and the second switch is turned OFF in a state in which the electric power is output from the battery such that the electric power supplied from the battery is supplied to the external device through the converter and the electric power generated by the electric generator is supplied to the external device.

4. The method of controlling the electric vehicle according to claim 3, wherein the electric generator is driven such that output voltage becomes equal to a required voltage of the external device, and the electric power is output from the battery at an amount corresponding to a shortfall of the electric power generated by the electric generator for a required power of the external device.

5. The method of controlling the electric vehicle according to claim 1, wherein the electric vehicle further has:

an additional battery connected to the second wire between a junction point of the second wire with the first wire and a junction point of the second wire with the third wire on a side of the first wire among junction points of the second wire with the third wire; and a third switch provided on the second wire between a junction point of the second wire with the additional battery and the junction point of the second wire with the first wire, and wherein in a case in which the electric power generated by the electric generator is supplied to the additional battery, the first switch is turned ON, the second switch is turned OFF, and the third switch is turned OFF such that the electric power generated by the electric generator is stored in the additional battery through the converter.

6. The method of controlling the electric vehicle according to claim 1, wherein the electric generator is a fuel cell.

7. The method of controlling the electric vehicle according to claim 6, wherein the fuel cell is a solid oxide fuel cell.

8. An electric vehicle system comprising:

a battery configured to store electric power;

a motor electrically connected to the battery through a first wire;

an external port connected to a second wire branched from the first wire, the external port being used for supply/reception of electric power to/from an external device;

a converter provided between the external port and the first wire on the second wire;

an electric generator provided on a third wire bypassing the converter from the second wire;

a first switch of the second wire on the external port side relative to the electric generator on the third wire;

a second switch provided on an opposite side of the first switch relative to the electric generator on the third wire; and a controller configured to control the battery, the electric generator, the first switch, and the second switch; wherein the controller turns one switch of the first switch and the second switch ON and turns other switch OFF in a case in which electric power generated by the electric generator is supplied to the external device through the converter, and the controller turns the one switch OFF and turns the other switch ON in a case in which the electric power generated by the electric generator is supplied to at least one of the motor and the battery through the converter.

* * * * *